United States Patent [19]

Marshall

[11] 4,149,384
[45] * Apr. 17, 1979

[54] FLUID PRESSURE AMPLIFIER

[76] Inventor: Don J. Marshall, Box 410, Edgewater, Md. 21037

[*] Notice: The portion of the term of this patent subsequent to Apr. 6, 1993, has been disclaimed.

[21] Appl. No.: 671,290

[22] Filed: Mar. 29, 1976

Related U.S. Application Data

[63] Continuation-in-part of Ser. No. 493,702, Aug. 1, 1974, Pat. No. 3,948,051.

[51] Int. Cl.$^2$ ............................................. F15B 7/02
[52] U.S. Cl. ........................................ 60/542; 60/560; 60/583; 60/593
[58] Field of Search ................ 60/542, 537, 593, 560, 60/583, 591, 592, 563; 91/4, 229

[56] References Cited

U.S. PATENT DOCUMENTS

| | | | |
|---|---|---|---|
| 2,547,233 | 4/1951 | Seppmann | 60/591 |
| 2,601,761 | 7/1952 | Fovron | 60/560 |
| 3,361,036 | 1/1968 | Harvey | 91/229 |
| 3,426,530 | 2/1969 | Georgelin | 60/583 |
| 3,507,189 | 4/1970 | Beckett | 91/4 |
| 3,948,051 | 4/1976 | Marshall | 60/542 |

FOREIGN PATENT DOCUMENTS 2017007 10/1971 Fed. Rep. of Germany ............. 60/593

*Primary Examiner*—Martin P. Schwadron
*Assistant Examiner*—Abraham Hershkovitz
*Attorney, Agent, or Firm*—William J. Dick

[57] ABSTRACT

A fluid pressure amplifier for intensifying fluid pressure, the amplifier comprising a housing including a hydraulic fluid reservoir therein. A first chamber includes a slave piston mounted for reciprocation therein and for abutting engagement with a workpiece. A hydraulic fluid path extends intermediate the reservoir and the first chamber and a second chamber lies in the path intermediate the first chamber and the reservoir and includes check means intermediate the first and second chambers. A third chamber includes a fluid intensifier piston having a head end and a tail end, the head end being mounted for reciprocation in the third chamber and the tail end being mounted for reciprocation in the second chamber, the head end of the piston having a larger diameter than the tail end. Gas admittance means admit a pressurized gas to a gas path which lies intermediate the gas admittance means and the reservoir. Means are disposed in the gas path to decrease the velocity of gas admitted to the reservoir while means are also disposed to apply gas pressure to the head end of the intensifier piston. The tail end of the intensifier piston is exposed to hydraulic pressure in the second chamber while the fluid intensifier piston is movable from a first position to a second position by gas pressure on the head end to thereby increase hydraulic pressure in the first chamber. Relief means are provided to effect a decrease of gas pressure upon the head end of the fluid intensifier piston when it reaches the second position so that the piston moves from the second back to the first position for a repeat of the cycle.

11 Claims, 7 Drawing Figures

FLUID PRESSURE AMPLIFIER

RELATION TO OTHER APPLICATIONS

This application is a continuation in part of an application filed on Aug. 1, 1974, Ser. No. 493,702, entitled "Fluid Pressure Amplifier" and now U.S. Pat. No. 3,948,051 issued on Apr. 6, 1976.

The purpose of this abstract is to enable the Public and the Patent Office to determine rapidly the subject matter of the technical disclosure of the application. This abstract is neither intended to define the invention of the application nor is it intended to be limiting as to the scope thereof.

SUMMARY OF THE INVENTION AND STATEMENT OF THE PRIOR ART

The present invention relates to a fluid pressure amplifier and more particularly an improved fluid pressure amplifier for automatically intensifying fluid pressure to accomplish work.

The prior art is fully discussed in Applicant's co-pending parent application, above identified. In Applicant's co-pending patent application the fluid pressure amplifier is described as including a gas-hydraulic interface piston upon which the gas (in the illustrated instance air) impinges and which effects a pressure transfer by way of the interface piston to the fluid contained in the hydraulic reservoir. While this works extremely well, it adds weight and cost to the final structure. The major reason for inclusion of the gas-hydraulic interface piston is to prevent the high velocity gas (air) from impinging directly on the oil in the reservoir causing frothing and breakdown of the oil, and escape of oil into and through the air passage to atmosphere. In the apparatus disclosed herein, however, means are provided for reducing the velocity of gaseous medium entering the fluid reservoir to thereby inhibit the frothing and breakdown problem, and to prevent its escape to atmosphere, and obviating the necessity for the gas-hydraulic piston. Moreover, it was discovered that in certain undefined instances, especially at times under very high load conditions (test) approaching the maximum output of the apparatus, the intensifier piston would tend to hang up near its bottom position of full stroke and fail to relieve the pressure on the head end of the intensifier piston necessitating the relieving of input air or gas pressure to the work stroke portion of the apparatus.

In view of the above, it is a principal object of the present invention to provide an improved fluid pressure amplifier for intensifying hydraulic or fluid pressure, which improvement serves to increase the reliability of the fluid pressure amplifier described in Applicant's co-pending application Ser. No. 493,702 while lowering its cost and weight.

Another object of the present invention is to provide an improved construction fluid pressure amplifier which will permit an initial long work stroke under reduced pressure until the workpiece is contacted and thereafter which permits automatically increasing the pressure on the ram to a sufficient extend to permit full movement thereof, the pressure on the ram being automatically raised to the desired level to effect working movement of the piston.

Yet another object of the present invention is to provide a novel fluid pressure amplifier which is of light weight and inexpensive construction so that it may be utilized as a portable tool for removing tires in apparatus such as described in Applicant's co-pending and above identified patent application and, in conjunction with the adaptor for portable power tire removing tools such as illustrated in Applicant's U.S. Pat. No. 3,841,380.

Still another object of the present invention is to provide an improved fluid pressure amplifier in the form of an air hydraulic ram which may effectively be utilized for purposes of replacing more conventional hydraulic rams, for example as both an actuator and for short working stroke rams used for piercing, coining, clamping, embossing, riveting, etc.

Other objects and a more complete understanding of the invention may be had by referring to the following specification and claims taken in conjunction with the accompanying drawings in which:

Figure 1:
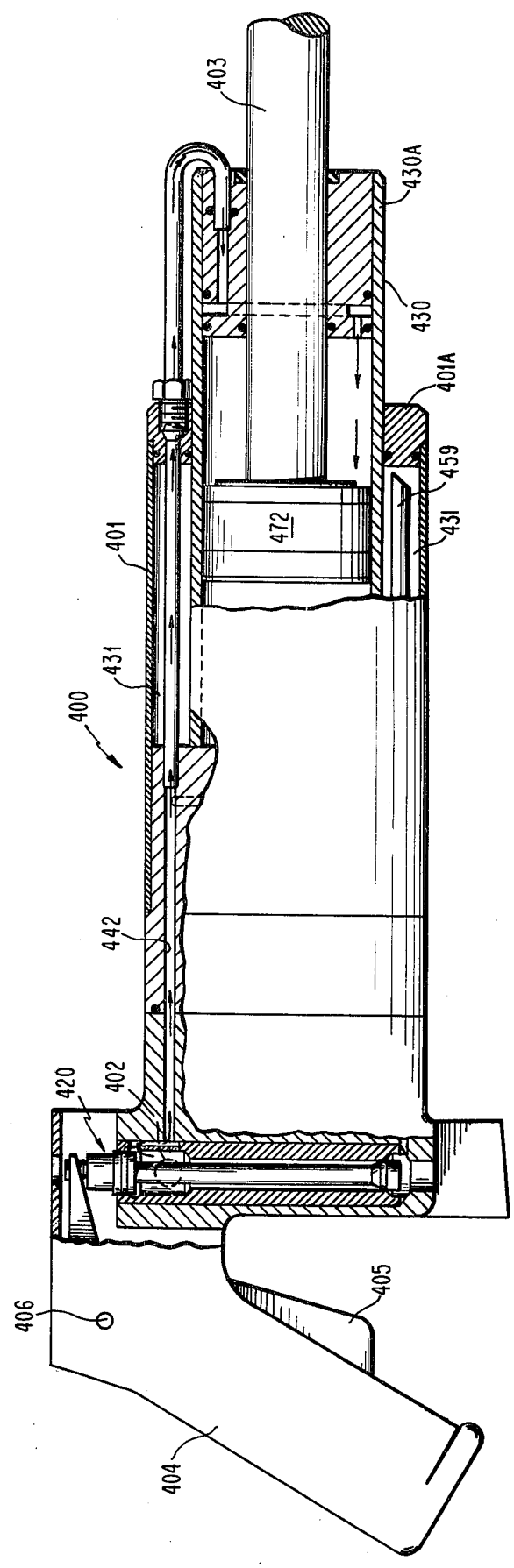
FIG. 1 is a fragmentary sectional schematic view in side elevation of a portable pressure amplifier constructed in accordance with the present invention.

Referring now to the drawings, and especially FIG. 1 thereof, an improved fluid pressure amplifier 400 for intensifying fluid pressure is illustrated therein. As shown, the amplifier generally comprises a cylindrical housing or casing 401 having a fluid, in the present instance a gaseous admittance means or air inlet connection 402 at one end thereof and a reciprocating work shaft 403 at the opposite end therefrom. In the illustrated instance the housing includes a hand grip or the like 404 to make the tool portable and includes a trigger 405 for actuating a valve assembly 420 to permit air to flow into the housing to cause the output shaft to move outwardly axially of the housing into contact with a workpiece, or to move axially inwardly of the housing into a retracted position depending upon the position of the valve assembly 420.

Figure 2:
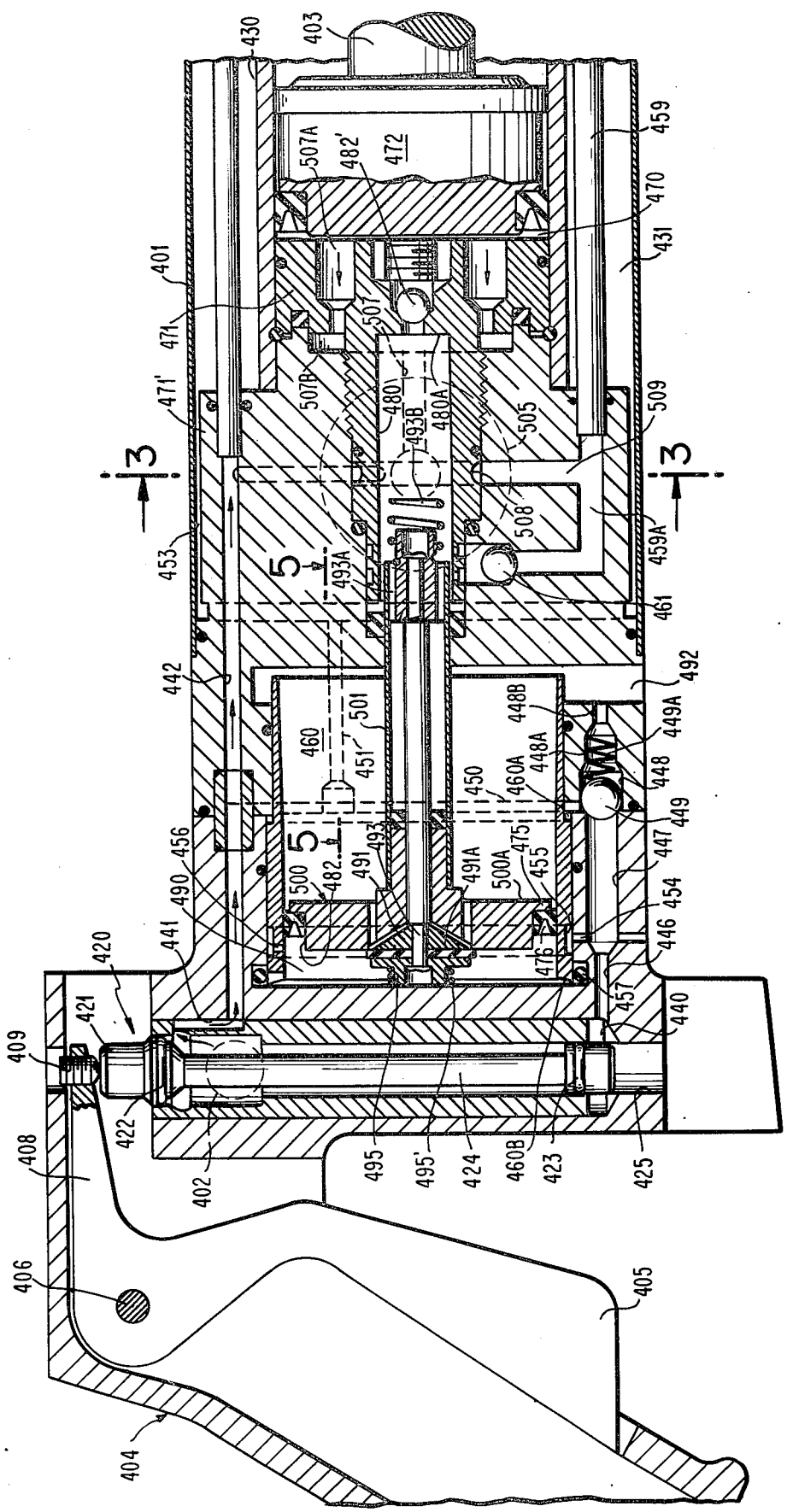
FIG. 2 is an enlarged fragmentary side elevational view of a portion of the apparatus illustrated in FIG. 1.

In accordance with the invention the fluid pressure amplifier operates to amplify fluid pressure from the air inlet connection 402 and multiply the pressure automatically as applied to the piston 472 to provide the necessary force to accomplish work on a workpiece by the shaft 403. To this end and referring now to FIGS. 1 and 2, the housing 401 includes an inner barrel 430 which is rigidly connected to the housing leaving an annular passage 431, which acts as a hydraulic fluid reservoir, in the housing intermediate the barrel and the interior of the housing. As shown in FIGS. 1 and 2, the barrel 430 is captured in the housing 401 and projects as at 430A beyond the terminal end 401A of the housing.

GENERAL DESCRIPTION OF THE AMPLIFIER

Due to the complexity of the pressure amplifier of the present invention, a brief description of the manner in which the amplifier operates to provide a high force work output at the shaft 403 follows.

The valve assembly 420 serves to couple and uncouple gaseous medium, in the present instance air pressure, alternately to one of the two air inlets 440 and 441 from the gas or air admittance means 402, air entering the air inlet 440 causing the output shaft 403 to extend axially of the housing 401 while air coupled to the second inlet 441 effects retraction of the output shaft 403, the uncoupled inlet simultaneously exhausting to atmosphere.

Air entering the air inlet 440 is coupled by way of a gas path, and by way of means in the gas path to decrease the velocity of the gas, to the hydraulic fluid reservoir 431. The gas path as well as the means to decrease the velocity of the gas or air admitted to the reservoir 431 will be described more fully hereinafter. Suffice at this time that as air pressure or gas pressure builds up in the fluid reservoir 431, hydraulic fluid pressure is applied through a fluid path 459 into a first chamber 470 interiorly of the barrel 430, the first chamber 470 being located intermediate a cylinder head 471 and a slave piston 472 which is coupled to the output shaft 403. Intermediate the first chamber and the reservoir 431, and in the fluid path 459 is a second chamber 480, there being check means 482' in the cylinder head 471 to permit fluid flow from the second chamber to the first chamber but not vice versa. Thus as may be seen, with reference to FIG. 2, as the hydraulic fluid in the reservoir 431 is pressurized, fluid pressure sufficient to overcome seal friction will be applied to the slave piston 472 causing rightward (reference FIGS. 1 and 2) movement of the output shaft 403. As the output shaft 403 meets resistance due to its abutting with a workpiece, pressure builds up in the first chamber until it is approximately equal to inlet line pressure and at that point fluid hydraulic pressure intensification commences.

Air or other gaseous media entering the air inlet 440 also enters into a third chamber 490 (FIG. 4) by way of an auxiliary gas path or conduit 454 and there contacts a fluid intensifier piston 500, the rear face of the head end 500A of the piston being in communication with the atmosphere as through a passage or the like 492. The intensifier piston 500 has a tail end 501 which is mounted for reciprocation in the second chamber 480; as illustrated the head end 500A of the piston has a larger diameter than the tail end. A pressure buildup in the third chamber 490 effects movement of the intensifier piston 500 to the right building up hydraulic pressure in the second chamber and therefore in the first chamber causing further force buildup on the output shaft 403. At a predetermined point pressure is released on the head end 500A of the intensifier piston 500 as by action of the opening of relief means 491 (see FIG. 4A) permitting air in the chamber 490 to escape through the passageway 492. Due to the sudden release of pressure on the intensifier piston, and by means which will be more fully explained hereinafter, the intensifier piston moves to the left and the check means 482', intermediate the first and second chambers 470 and 480 respectively, prevents fluid backflow from the first chamber to the second chamber while permitting the fluid intensifier piston 500 to move to the left for further reciprocatory movement. Thus the fluid intensifier piston reciprocates in the third chamber gradually building up pressure in the second and thus the first chamber and causing further movement of the output shaft 403 until the work desired is accomplished.

Upon the valve assembly 420 being moved to its second position, air enters into the second air inlet 441 (see FIG. 2) supplying air pressure into line 442 and causing air to enter as through the path shown in FIG. 1 to the forward side of the slave piston 472 causing the slave piston to move to the left, and thus the output shaft 403 to be retracted.

Figure 3:
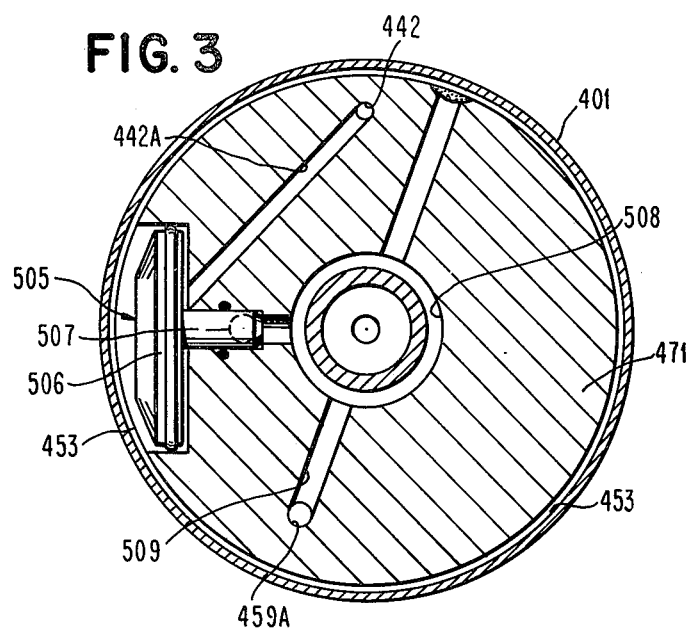
FIG. 3 is a fragmentary sectional view taken along the line 3—3 of FIG. 2.
Figure 5:
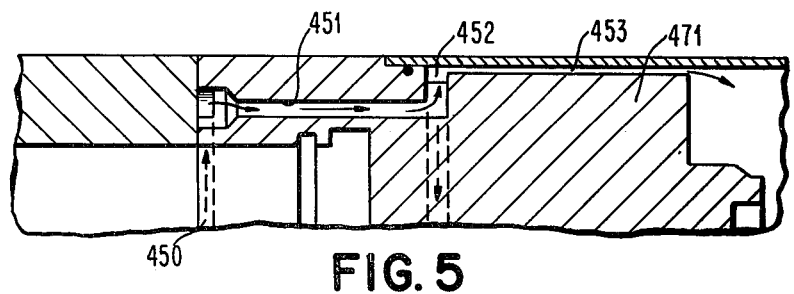
FIG. 5 is a fragmentary sectional view taken along line 5—5 of FIG. 3.
Figure 6:
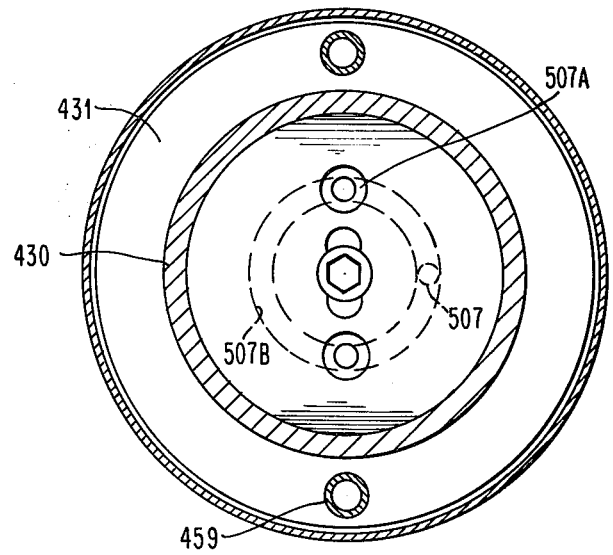
FIG. 6 is a fragmentary sectional view taken along line 6—6 of FIG. 4.

It is obvious that as air pressure in line 442 causes the slave piston to move to the left, the check means 482' intermediate the first and second chambers 470 and 480 respectively is operative to inhibit fluid flow from the first chamber to the second chamber and back to the reservoir. During the pressurizing cycle when air is entered into the inlet opening 440, and referring especially to FIG. 3, a needle valve 505 having a piston 506 thereon closes off the return line 507 to the reservoir because the piston 506 is in the gas path. When the trigger 405 is released, and the valve assembly is in the up position, air enters line 442 and through passageway 442A unseats the piston due to air pressure below the piston 506. Upward movement of the piston opens the return line or passageway 507 and allows fluid from the first chamber to flow through passages 507A, annular groove 507B and passageway 507 into a second annular groove 508 around the second chamber, and into line 509 back into the hydraulic reservoir 431. (For ease of identification these lines are shown dotted in FIGS. 2 and 4.)

DETAILED DESCRIPTION

Air Connection and Inlet Valve Assembly

Figure 4:
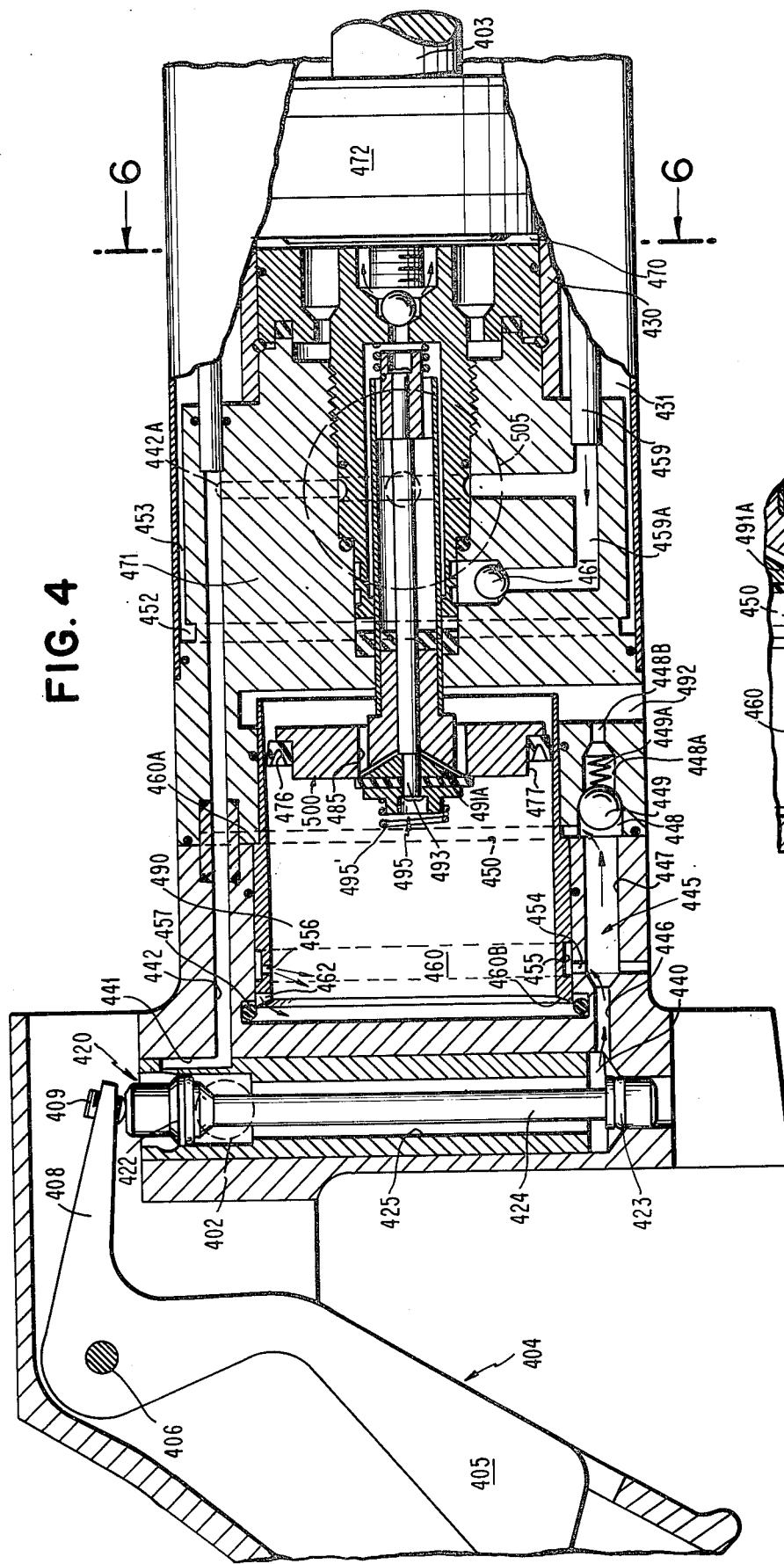
FIG. 4 is an enlarged fragmentary sectional view in side elevation illustrating portions of the apparatus shown in FIG. 2 in a second position.

Although the inlet valve assembly 420 and the operation thereof may take any convenient form for example the form illustrated in Applicant's co-pending application, the valve assembly illustrated in FIGS. 1, 2 and 4 with its associated trigger mechanism is particularly adapted for a portable tool such as the one illustrated. To this end, and referring first to FIGS. 1 and 2, trigger 405 is pivoted as at 406 in the handle 404, the trigger including a tang 408 including an adjustment screw 409 which bears against the upper part of a valve spool 421. The trigger may be biased by any conventional means such that when the trigger is not depressed, the spool 421 will be maintained in its elevated position such as is shown in FIGS. 1 and 2. As may be appreciated from the following description when air pressure is applied to inlet 402, it will automatically tend to raise or elevate the spool 421. As best illustrated in FIGS. 1, 2 and 4, the spool 421 includes an upper enlarged end seal portion 422 and a lower seal carrying end portion 423 joined by a spool shaft 424. The spool is adapted for reciprocation in a bore 425 which is open at both ends to the atmosphere. When the spool is in the position illustrated in FIG. 2, gaseous medium entering admittance means 402 passes upwardly in the direction of the arrow and into the air inlet 441 causing pressure to be placed on the afterface of the slave piston 472, thereby retracting shaft 403 and filling the reservoir 431 with hydraulic fluid. The seal of the upper enlarged end portion 422 of the spool inhibits air leakage to the atmosphere by way of the upper end of the bore 425. Alternatively, the lower seal carrying end 423 of the spool is above the air inlet 440 (FIG. 2) allowing any air entrapped within the system to bypass the lower end of the spool and pass to the atmosphere out the bottom of the bore 425. When the spool is depressed, as illustrated best in FIG. 4, air entering the air admittance means 402 passes downwardly about the shaft 424 in the bore 425 and into the first air inlet 440, the lower seal carrying end 423 of the spool preventing air escaping out of the bore 425 and to the atmosphere. Alternatively, the upper enlarged end seal portion 422 of the spool seals the bore therebelow while opening the conduit 442 to the atmosphere and insuring that there is atmospheric pressure against the back face of the piston 472.

Gas-Hydraulic Interaction

Prior to pressure intensification for amplification of hydraulic force against the slave piston 472, it is necessary and desirable that the output shaft 403 move the distance necessary to bring it into contact with the workpiece upon which it is to operate. For example, in U.S. Pat. No. 3,841,380 of the present inventor, the fluid pressure amplifier of the present invention may be employed as the power unit, in which instance a wedge is attached to the output shaft 403 (the wedge being utilized to break the bead between the tire and its rim). In the instance of using the fluid pressure amplifier as a power unit, it is necessary that the output shaft travel a sufficient distance to contact a tire under the rim, and thereafter pressure intensification may occur which causes bead separation from the rim to effect such tire removal.

Thus the apparatus of the present invention operates in a dual mode, the first mode of operation effects a movement of the output shaft for coming into contact with the workpiece, and in the second mode movement occurs under high pressure to effect the necessary work to accomplish the end desired. To this end air enters the first air inlet 440 (FIG. 4) and then into the gas or air path 445 which extends intermediate the air admittance means 402 and the reservoir 431. As air enters the inlet 440, it passes into a conduit 446 and an enlarged extension 447. A further enlarged bore 448 having step portions 448A and 448B extends into the passageway 492 and therein is exposed to atmospheric pressure. A check means, in the illustrated instance a check ball 449 is biased as by the spring 449A into engagement with the edge of the conduit 447 and, until pressurized, seals the conduit 447. Upon air entry into the enlarged extension 447, the ball 449 moves rearwardly leaving its seat until the ball moves from the position shown in FIG. 2 to the position shown in FIG. 4 wherein it engages its after seating position which opens the pressurized air into an annular groove 450 in the exterior of a sleeve or liner 460 mounted for limited reciprocation in the third chamber 490. It should be noted at this time that the sleeve 460 has an abutment or shoulder 460A which is exposed to the gas or air pressure entering the groove 450 tending to maintain the sleeve in its leftward or first position such as illustrated best in FIG. 2, and FIG. 4A. The purpose of the sleeve, and its means of operation will be more fully explained hereinafter. Air leaving the groove 450 in the exterior of the sleeve enters a distribution conduit 451, an annular groove 452 and then into a velocity decreasing means, in the illustrated instance an annular space 453 surrounding or circumscribing the body 471'. It should be recognized that the annular space 453 defined between the housing 401 forms means to decrease the velocity of gas admitted to the reservoir 431. An examination of the drawing, even though not to scale, will indicate the reason for the decrease in the gas or air velocity as it enters the reservoir 431. For example, looking at FIG. 2, the diameter and thus the cross sectional area of the conduit 446 is small as compared with the cross sectional area between the outside of the cylinder head 471 and the inside of the housing 401 and forming the space 453. Thus the space 453 circumscribing the cylinder head 471 provides for a greater cross sectional area than the cross sectional area of the conduit 446 thus reducing the velocity of gaseous medium passing through the annular space and impinging upon the hydraulic fluid in the reservoir. In this manner, frothing and excessive beading of the oil by air or the like is prevented. Additionally, it should be recognized that inasmuch as there is a direct connection between the reservoir 431 and the inlet 440, if the tool is stored handle down, hydraulic fluid may leak through the gas path and out of the inlet 440 but for the soft elastomeric check ball 449 sealing the conduit 447 and 448 from the groove 450.

As previously described, as the oil in the reservoir 431 is pressurized, fluid pressure is communicated through the fluid hydraulic path or conduit 459 into the second chamber 480 and there through the check means 482' to pressurize the first chamber 470. Hydraulic pressure communicated through the hydraulic passageway or path enters a conduit extension 459 in the body 471' where it upsets a check valve 461 permitting fluid to flow and pressure to be increased in the second chamber 480. The check ball 461, as will be made more evident hereinafter, prevents fluid pressure communication from the second chamber 480 back into the reservoir when pressure intensification occurs due to the reciprocation of the intensifier piston 500. As fluid pressure builds up in the first chamber 470 the slave piston 472, which is mounted for reciprocation within the barrel 430, moves to the right until the output shaft 403 contacts the workpiece upon which work is to be accomplished. When fluid pressure against the slave piston 472 reaches a condition where the gas or air pressure against the fluid in the reservoir 431 is such as to overcome system seal friction, working on the minor area of piston tail end 501, intensification of the fluid hydraulic pressure against the slave piston commences.

Amplification Circuit

Upon system pressures reaching sufficient levels, normally after the work element contacts the workpiece and meets resistance, fluid pressure intensification occurs. To this end, and referring now to FIG. 4, as air enters the conduit 446 it also enters an auxiliary gas path 454 into an annular groove 455 in the exterior of the sleeve or liner 460, and then through a bleed aperture 456 to permit air entry into the head end 500A of the intensifier piston 500. As air pressure builds up in the third chamber 490, the forward end 460B of the liner 460 also sees gas pressure and inasmuch as the cross sectional area of the forward end 460B of the liner is greater than the shoulder or abutment 460A in the groove 450, the sleeve 460 starts to move from its first position at the left end of the chamber 490 towards its second position to the right end. As the liner 460 moves to the right, it moves past a seal 457 and a greater quantity of air now rushes in through a notch 462 in the forward end 460B of the liner and enters into the first chamber 470 at a high volume and high pressure accelerating the motion of the intensifier piston 500 towards its second position and amplifying or increasing the pressure in the second chamber.

The intensifier piston head end 500A includes a circumferentially extending shoulder or rim 475 to effect seating of an annular flexible and expansible seal 476 which circumscribes the cylindrical portion 477 of the head end 500A of the piston. The seal 476 is radially expandible so as to insure proper sealing action against the interior wall of the liner 460 as the piston 500 moves from its first position to its second position.

Figure 4A:
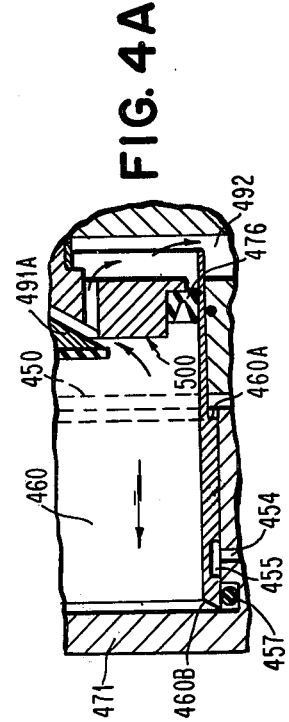
FIG. 4A is an enlarged fragmentary sectional view of a portion of the apparatus illustrated in FIG. 4 and showing the apparatus in still another position.

When the intensifier piston moves all the way to the right, relief means are provided to relieve the pressure on the head end of the piston to facilitate the movement of the piston from its second position to its first position. To this end, and referring now to FIG. 4, the intensifier piston includes relief means 491 which is a frusto-conical poppet valve 491A including a shaft 493 which extends through the intensifier piston and terminates in a projection 493A with energy storing means such as a spring 493B wound thereon. Upon the intensifier piston moving from its first position to the left to the second position to the right and striking the bottom wall portion 480A of the second chamber 480, the poppet 491A is opened such as illustrated in FIG. 4A and the pressure in the chamber 490 is relieved by way of the passages 485 and to the atmosphere by way of passageway 492. Thereafter, the pressure differential existing in the second chamber versus the substantially atmospheric condition existing in the third chamber causes additional fluid pressure to be applied through the hydraulic fluid path 460 into the second chamber, check valve 482' being closed, and the intensifier piston moves to the left or back to its first position until a projection 495 on the front portion of the poppet 491A strikes the frontal wall of the chamber 490 causing the poppet to be reseated. In this connection, cushioning means, in the illustrated instance a spring 495' tends to reduce the impact of the projection 495 against the forward wall of the third chamber.

As pressure builds up in the first chamber 470 due to increased resistance of a workpiece against the shaft 403, and under certain load conditions, it becomes more and more difficult to open the poppet 491A inasmuch as the piston tends to slow down. Eventually this can effectively stall the piston near the bottom of its stroke with insufficient force being developed over the exposed area of the shaft 493 and the poppet will not open. To alleviate this condition, and in accordance with another feature of the present invention, it has been found that tapering the interior of the liner so that its after end has a slightly greater diameter than the forward end, effectively increases the hydraulic force differential biasing the poppet to the open position inasmuch as the diameter/area ratio of the poppet to its stem 493 remains constant, while the ratio of the piston face 500, due to expansion of seal 476 increases with respect to tail end 501, thus increasing the pressure intensifying capability of 500/501 as compared to 491/493. This additional pressure build up in the second chamber aids the spring and the striking of the protrusion 493A in causing the poppet 491A to open. Thus the taper in the wall of the liner serves to increase the upset force which effects an opening action of the poppet and aids in effecting a lower differential pressure to cause the opening of the poppet than would be necessary if the liner was the same internal diameter at both the head end and the tail end of the piston.

It should be noted that upon the poppet 491A opening and thus relieving the pressure in the third chamber 490 as shown in FIG. 4A, pressure is also relieved on the forward face of the liner 460. As shown in FIG. 4A, this tends to cause the liner to move once again to the leftward position striking the end wall of the third chamber 490 because of the air entry pressure into the annulus 450A and against the shoulder 460A of the liner. Thus the forward end or face of the sleeve or liner 460 is intermittently exposed to gas pressure entering the third chamber 490 while the gas pressure against the shoulder 460A of the liner tends to bias the liner into a position towards the forward end thereof. The cycle then repeats itself causing the intensifier piston to move to the left and back again to the right until the work desired has been accomplished and the trigger is released.

Although the invention has been described with a certain degree of particularity, it is understood that the present disclosure has been made only by way of example and numerous changes in the detail of construction and the combination and arrangement of parts and the mode of operation may be made without departing from the scope of the invention as hereinafter claimed.

What is claimed is:

1. An improvement in a fluid pressure intensifying amplifier, said amplifier comprising: a slave piston mounted for reciprocation in a first chamber; a hydraulic fluid path connected to said first chamber so that pressurization of fluid in said fluid path effects movement of said slave piston in said first chamber; a second chamber in said hydraulic path, and check means intermediate said first and second chambers to permit fluid pressure from said second chamber into said first chamber but to inhibit fluid flow from said first chamber to said second chamber, a fluid intensifier piston having a head end and a tail end, said head end having a larger diameter than said tail end; a gaseous medium inlet and a gas path connected thereto for pressurizing hydraulic fluid in said hydraulic fluid path; a third chamber and an auxiliary gas path connected to said third chamber for applying gas pressure to said head end of said intensifier piston; said tail end of said intensifier piston being disposed in said second chamber and said head end of said intensifier piston being disposed in said third chamber, said fluid intensifier piston being reciprocatable between a first and second position to pressurize hydraulic fluid in said second chamber to increase hydraulic pressure against said slave piston, and gaseous medium relief means to automatically relieve the pressure on the head end of said intensifier piston when said piston is in said second position whereby said piston moves from its second to its first position to thereby continue reciprocation and concomitantly intensify fluid hydraulic pressure in said first chamber; said improvement comprising: a sleeve mounted for reciprocation in said third chamber circumscribing said head end of said piston, said sleeve having a forward end and an after end, said forward end having a larger area intermittently exposed to gas entering said third chamber from said auxiliary gas path; a shoulder on said sleeve exposed to gaseous medium entering said amplifier, said shoulder positioned to bias said sleeve in a position towards said forward end thereof, said shoulder having an area less than the area of said forward end of said sleeve intermittently exposed to gas pressure from said auxiliary gas path whereby the net effect of intermittent versus constant pressure times area is to effect a reciprocal motion of said sleeve between a first position to restrict the flow of gas medium to the head end of said amplifier piston and a second position towards the after end of said sleeve to permit unrestricted flow of said gaseous medium to the head end of said fluid intensifier piston.

2. An amplifier in accordance with claim 1 including means in said gas path to reduce the velocity of gaseous medium impinging upon hydraulic fluid in said hydraulic path.

3. An amplifier in accordance with claim 1 including a radially expandible seal circumscribing said head end of said intensifier piston and engageable with the interior surface of said sleeve, said sleeve being tapered in the direction of movement of said intensifier piston from its first to its second position.

4. An amplifier in accordance with claim 3 wherein said relief means comprises a poppet valve in said head end of said intensifier piston and passageways beneath said poppet valve for providing a gas path to the atmosphere, said poppet valve sealing said passageways when said intensifier piston moves from its first to its second position and open when said piston moves from the second to its first position, and means associated with said poppet valve to effect opening thereof upon said intensifier piston reaching said second position, said means including a differential force arrangement favoring opening of the poppet in the second position and favoring closing in the first position.

5. An amplifier in accordance with claim 4 wherein said means to effect opening of said poppet valve comprises a shaft connected to said poppet and extending through said tail end, and means in said second chamber to contact said shaft and aid in the opening of said poppet valve when said intensifier piston moves from its first to its second position.

6. An amplifier in accordance with claim 1 including a gas bleeder aperture in said sleeve and in said auxiliary gas path, a notch in the forward end of said sleeve and in communication with said auxiliary gas path and means to seal said notch when said sleeve is in said first position and uncover said notch when said sleeve is in said second position.

7. An amplifier for intensifying fluid pressure, said amplifier comprising: a hydraulic fluid reservoir; a first chamber, and a slave piston mounted for reciprocation in said first chamber; a hydraulic fluid path between said reservoir and said first chamber so that pressurization of fluid in said reservoir effects movement of said slave piston a fluid intensifier piston, said fluid intensifier piston having a head end and a tail end, said head end having a larger diameter than said tail end; a second chamber in said hydraulic path and housing said tail end of said intensifier piston, and check means intermediate said first and second chambers to permit fluid pressure from said second chamber into said first chamber but to inhibit said fluid flow from said first chamber to said second chamber; a third chamber mounting said head end of said intensifier piston, a gaseous medium inlet and a gas path connected thereto for pressurizing hydraulic fluid in said reservoir and an auxiliary gas path for applying gas pressure to said head end of said intensifier piston in said third chamber; means to reduce the velocity of gaseous medium entering said fluid reservoir by way of said gas path; said fluid intensifier piston being reciprocatable between a first and second position to pressurize hydraulic fluid in said second chamber to increase hydraulic pressure against said slave piston, and gas pressure relief means to relieve the pressure on the head end of said intensifier piston when said piston is in said second position so that said piston moves from its second to its first position, and means to close said relief means when said intensifier piston is in its first position to automatically repeat the intensification cycle as long as gas pressure is applied to said gaseous medium inlet, said third chamber including a sleeve mounted for reciprocation and circumscribing said head end of said piston, said sleeve having a forward end and an after end, said forward end being exposed to gas entering said third chamber from said auxiliary gas path; said after end of said sleeve being exposed to atmospheric pressure, a shoulder on said sleeve exposed to gas pressure from said gas path, said shoulder positioned to sustain said sleeve in a position towards said forward end thereof, said shoulder having an area less than the area of said forward end of said sleeve exposed to intermittent gas pressure from said auxiliary gas path whereby the net effect of pressure times area is to force the sleeve towards the after end thereof, said sleeve being movable between a first position to restrict the flow of gas medium to the head end of said amplifier piston and a second position towards the after end of said sleeve to permit unrestricted flow of said gaseous medium to the head end of said fluid intensifier piston.

8. An amplifier in accordance with claim 7 including check means in said fluid path intermediate said reservoir and said second chamber and operative to inhibit fluid communication from said second chamber to said reservoir when fluid pressure in said second chamber is higher than fluid pressure in said reservoir.

9. An amplifier in accordance with claim 7 including a radially expandible seal circumscribing said head end of said intensifier piston and engageable with the interior surface of said sleeve, said sleeve being tapered in the direction of movement of said intensifier piston from its first to its second position.

10. An amplifier in accordance with claim 7 including an elastomeric check ball in said gas path in a cooperative recess, said check ball operative to allow unrestricted gas flow through said gas path during gas pressurization thereof and to block said path when there is an absence of pressurization in said gas path thereby preventing hydraulic fluid loss during storage of said amplifier.

11. An amplifier in accordance with claim 7 including a gas bleeder aperture in said sleeve and in said auxiliary gas path, a notch in the forward end of said sleeve and in communication with said auxiliary gas path and means to seal said notch when said sleeve is in said first position and uncover said notch when said sleeve is in said second position.

* * * * *